(12) United States Patent
Sosnowski et al.

(10) Patent No.: US 10,554,429 B2
(45) Date of Patent: Feb. 4, 2020

(54) EFFICIENT ERROR CONTROL TECHNIQUES FOR TCP-BASED MULTICAST NETWORKS

(71) Applicant: INTEL CORPORATION, Santa Clara, CA (US)

(72) Inventors: Maciej Sosnowski, Gdarísk (PL); Miroslaw Walukiewicz, Gdarísk (PL)

(73) Assignee: INTEL CORPORATION, Santa Clara, CA (US)

( * ) Notice: Subject to any disclaimer, the term of this patent is extended or adjusted under 35 U.S.C. 154(b) by 74 days.

(21) Appl. No.: 15/755,427

(22) PCT Filed: Sep. 25, 2015

(86) PCT No.: PCT/PL2015/000153
§ 371 (c)(1),
(2) Date: Feb. 26, 2018

(87) PCT Pub. No.: WO2017/052393
PCT Pub. Date: Mar. 30, 2017

(65) Prior Publication Data
US 2018/0254915 A1    Sep. 6, 2018

(51) Int. Cl.
*H04L 12/18* (2006.01)
*H04L 29/06* (2006.01)
(Continued)

(52) U.S. Cl.
CPC .... *H04L 12/1872* (2013.01); *H04L 29/06095* (2013.01); *H04L 45/04* (2013.01); *H04L 47/34* (2013.01); *H04L 69/163* (2013.01)

(58) Field of Classification Search
None
See application file for complete search history.

(56) References Cited

U.S. PATENT DOCUMENTS

| 6,415,312 B1 * | 7/2002 | Boivie | H04L 1/1803 370/351 |
|---|---|---|---|
| 6,622,172 B1 | 9/2003 | Tam | |

(Continued)

FOREIGN PATENT DOCUMENTS

WO    0001123    1/2000

OTHER PUBLICATIONS

International Search Report and Written Opinion received for PCT Patent Application No. PCT/PL2015/000153, dated Jun. 20, 2016, 13 pages.

*Primary Examiner* — Brian S Roberts

(57) ABSTRACT

Efficient error control techniques for TCP-based multicast networks are described. In one embodiment, for example, an apparatus may comprise at least one memory and logic for routing data at a node of a TCP multicast tree, at least a portion of the logic comprised in hardware coupled to the at least one memory, the logic to identify a data segment that has been retransmitted to the node from an adjacent upstream node, determine whether each of a plurality of adjacent downstream nodes have acknowledged at least one previous transmission of the data segment, and in response to a determination that one or more of the adjacent downstream nodes have not acknowledged at least one previous transmission of the data segment, forward the data segment to each of the one or more adjacent downstream nodes. Other embodiments are described and claimed.

25 Claims, 9 Drawing Sheets

(51) Int. Cl.
*H04L 12/715* (2013.01)
*H04L 12/801* (2013.01)

(56) References Cited

U.S. PATENT DOCUMENTS

| | | |
|---|---|---|
| 2002/0091846 A1* | 7/2002 | Garcia-Luna-Aceves ................... H04L 12/18 709/230 |
| 2010/0014520 A1 | 1/2010 | Matsumoto et al. |
| 2012/0117438 A1* | 5/2012 | Shaffer ................ H04L 1/1825 714/749 |

* cited by examiner

| Sequence Number | Length |
|---|---|
| 128 | 32 |
| 192 | 64 |

302 → (first row)
304 → (second row)

| Entry ID | Highest ACK No. | Times Received |
|---|---|---|
| 1 | 127 | 2 |
| 2 | 159 | 1 |
| 3 | 255 | 1 |

| Min. Highest ACK No. | Entry ID(s) | Times Forwarded |
|---|---|---|
| *127* | *1* | *1* |

US 10,554,429 B2

EFFICIENT ERROR CONTROL TECHNIQUES FOR TCP-BASED MULTICAST NETWORKS

CROSS-REFERENCE TO RELATED APPLICATION CASE

This application is a national phase claiming the benefit of and priority to International Patent Application No. PCT/PL2015/000153, filed Sep. 25, 2015, entitled "EFFICIENT ERROR CONTROL TECHNIQUES FOR TCP-BASED MULTICAST NETWORKS", which is hereby incorporated by reference in its entirety.

TECHNICAL FIELD

Embodiments herein generally relate to communications between devices in multicast networks.

BACKGROUND

In a multicast network, data sent from a source server may be routed to a plurality of client devices. Such data may be routed to the client devices through a multicast tree, via one or more layers of intermediate routing nodes. A given intermediate routing node may receive data from an adjacent upstream node, which may comprise an intermediate routing node of a higher layer or may comprise the source server itself. The given intermediate routing node may forward the received data to a plurality of adjacent downstream nodes, which may comprise intermediate routing nodes of a lower layer or may comprise client devices.

BRIEF DESCRIPTION OF THE DRAWINGS

FIG. 3 illustrates an embodiment of a first table.
FIG. 4 illustrates an embodiment of a second table.
FIG. 5 illustrates an embodiment of a third table.

DETAILED DESCRIPTION

Various embodiments may be generally directed to efficient error control techniques for TCP-based multicast networks. In some embodiments, for example, an apparatus may comprise at least one memory and logic for routing data at a node of a TCP multicast tree, at least a portion of the logic comprised in hardware coupled to the at least one memory, the logic to identify a data segment that has been retransmitted to the node from an adjacent upstream node, determine whether each of a plurality of adjacent downstream nodes have acknowledged at least one previous transmission of the data segment, and in response to a determination that one or more of the adjacent downstream nodes have not acknowledged at least one previous transmission of the data segment, forward the data segment to each of the one or more adjacent downstream nodes. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
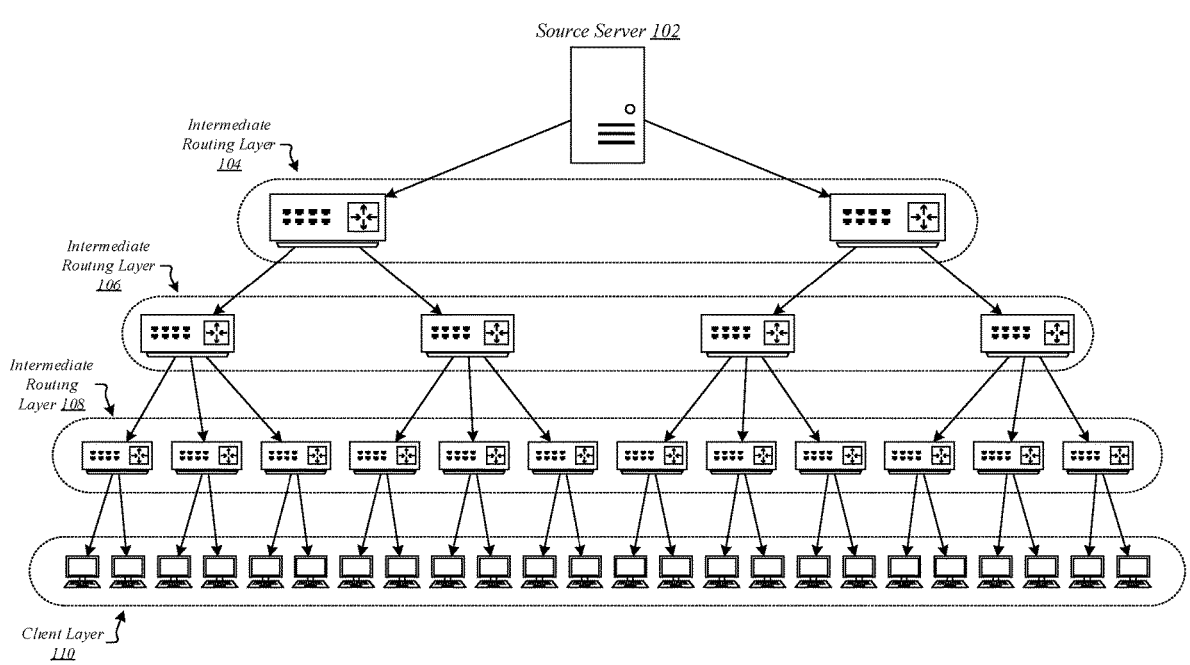
FIG. 1 illustrates an embodiment of a multicast network.

FIG. 1 illustrates an example of a multicast network 100 that may be representative of various embodiments. As shown in FIG. 1, multicast network 100 comprises a tree structure. A source server 101 resides at a top layer of multicast network 100, and sends data downstream through the network to a plurality of clients in a client layer 110. The data that source server 101 transmits is routed to the plurality of clients via an intermediate routing node 102 and three intermediate routing layers 104, 106, and 108, each of which comprise multiple intermediate routing nodes. Intermediate routing layer 104 is the highest layer of the three, and receives data transmissions intermediate routing node 102. Each of the two intermediate routing nodes of intermediate routing layer 104 routes data to two respective intermediate routing nodes in intermediate routing layer 106. In turn, each of the four intermediate routing nodes in intermediate routing layer 106 routes data to three respective intermediate routing nodes in intermediate routing layer 108. Finally, each of the twelve intermediate routing nodes in intermediate routing layer 108 routes data to two respective clients in client layer 110, which comprises a total of 24 clients. It is to be appreciated that the embodiments are not limited to the numbers of devices or the numbers of layers depicted in this example.

In the discussion that follows, the term "adjacent upstream node" shall be employed to denote—with respect to a given intermediate routing node—an upstream node that provides data to that intermediate routing node directly, rather than indirectly via one or more intervening routing layers. For example, in operating environment 100, each node in intermediate routing layer 104 comprises an adjacent upstream node with respect to a respective set of two nodes in intermediate routing layer 106. The term "adjacent downstream node" shall be employed to denote—with respect to a given intermediate routing node—a downstream node that receives data from that intermediate routing node directly, rather than indirectly via one or more intervening routing layers. For example, in operating environment 100, each node in intermediate routing layer 108 comprises an adjacent downstream node with respect to a particular respective one of the four nodes in intermediate routing layer 106. The embodiments are not limited to these examples.

In order to make communications in multicast network 100 reliable, it may be desirable to leverage various reliability assurance mechanisms associated with the Transmission Control Protocol (TCP). However, TCP does not support multicast transmissions—in order to transmit a same data packet to multiple recipients, a sender would need to establish a separate TCP unicast session for each recipient.

This may result in a variety of inefficiencies, such as network bandwidth associated with transmitting multiple segments with identical payloads, network Jo bandwidth waste associated with receiving separate acknowledgments (ACKs) for the same piece of data from multiple clients, and CPU resource waste associated with processing multiple TCP sessions for transmitting the same data.

Disclosed herein are techniques that may implemented in order to address these issues and enable the introduction of TCP-based multicast networks with efficient error control operations. According to some such techniques, when a routing node receives a retransmission of a previously received packet from an adjacent upstream node, it may only forward the retransmitted packet to adjacent downstream nodes that have not already acknowledged receipt of a previous transmission of that packet. In various embodiments, rather than forwarding individual acknowledgments of a given packet upstream separately, the routing node may wait until each of its adjacent downstream nodes has acknowledged receipt of a transmission of the packet, and may then transmit a single collective acknowledgment of the packet to its adjacent upstream node. The embodiments are not limited in this context.

Figure 2:
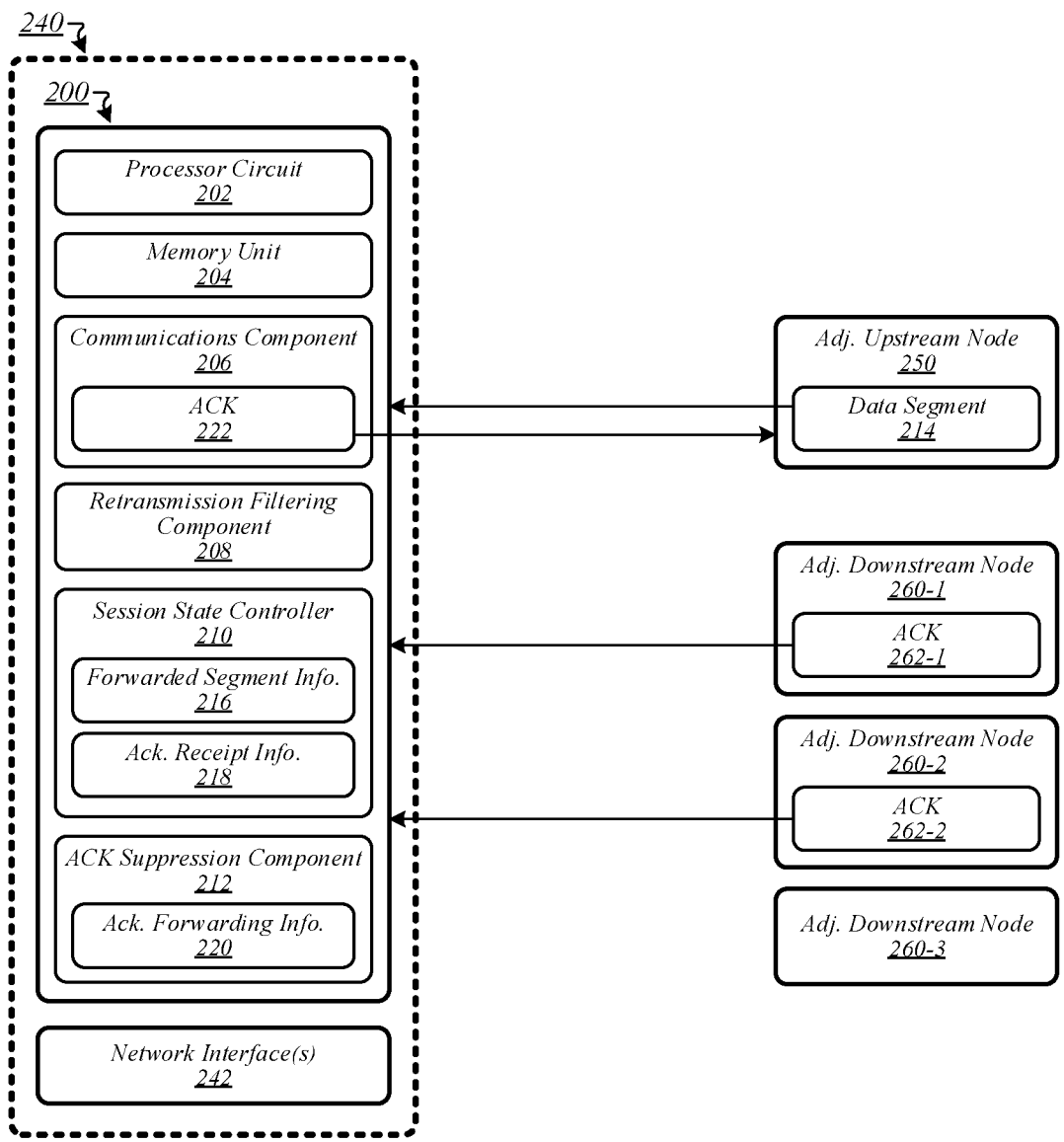
FIG. 2 illustrates an embodiment of an apparatus and an embodiment of a system.

FIG. 2 illustrates a block diagram of an apparatus 200 that may be representative of a node that may implement efficient error control techniques for TCP-based multicast networks in some embodiments. In various embodiments, apparatus 200 may be representative of an intermediate routing node, such as one comprised in intermediate routing layer 104, intermediate routing layer 106, or intermediate routing layer 108 in operating environment 100 of FIG. 1. As shown in FIG. 2, apparatus 200 comprises multiple elements including a processor circuit 202, a memory unit 204, a communications component 206, a retransmission filtering component 208, a session state controller 210, and an ACK suppression component 212. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a communications component 206. Communications component 206 may comprise logic, circuitry, and/or instructions operative to send messages to one or more remote devices and/or to receive messages from one or more remote devices. In some embodiments, communications component 206 may be operative to send and/or receive messages over one or more wired connections, one or more wireless connections, or a combination of both. In various embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 200 may comprise a retransmission filtering component 208. Retransmission filtering component 208 may comprise logic, circuitry, and/or instructions generally operative to manage data segment forwarding operations of apparatus 200 in such a way as to reduce the network bandwidth consumption associated with those operations. More particularly, in various embodiments, retransmission filtering component 208 may be operative to manage data segment forwarding such that retransmitted data segments that are received from an adjacent upstream node are only forwarded to adjacent downstream nodes that have need for them. The embodiments are not limited in this context.

In some embodiments, apparatus 200 may comprise a session state controller 210. Session state controller 210 may comprise logic, circuitry, and/or instructions generally operative to keep track of messages of various types that apparatus 200 may send and/or receive during ongoing operations. More particularly, in various embodiments, session state controller 210 may be operative to maintain a record of the various data segments that apparatus 200 may send to adjacent downstream nodes and a record of the various ACKs that apparatus 200 may receive from those adjacent downstream nodes. The embodiments are not limited in this context.

In some embodiments, apparatus 200 may comprise an ACK suppression component 212. ACK suppression component 212 may comprise logic, circuitry, and/or instructions generally operative to manage ACK transmission operations of apparatus 200 in such a way as to achieve a reduced frequency of upstream ACK transmissions in order to help protect the network from potential network overload. More particularly, in various embodiments, ACK suppression component 212 may be operative to manage ACK transmission operations such that ACKs received from adjacent downstream nodes are not forwarded upstream individually. The embodiments are not limited in this context.

FIG. 2 also illustrates a block diagram of a system 240. System 240 may comprise any of the aforementioned elements of apparatus 200. System 240 may further comprise one or more network interfaces 242. Network interface(s) 242 may generally enable apparatus 200 and/or system 240 to transmit and receive signals in order to communicate across one or more networks, which may include wired networks, wireless networks, or both. In some embodiments, network interface(s) 242 may enable apparatus 200 and/or system 240 to communicate with one or more external devices in a multicast network. For example, in various embodiments, apparatus 200/system 240 may be representative of an intermediate routing node in intermediate routing layer 106 of FIG. 1, and network interface(s) 242 may enable apparatus 200/system 240 to communicate with an adjacent upstream node in intermediate routing layer 104 and a plurality of adjacent downstream nodes in intermediate routing layer 108. The embodiments are not limited to this example.

In some embodiments, apparatus 200 and/or system 240 may generally be operative to receive data from an adjacent upstream node 250 and route that data to adjacent downstream nodes 260-1, 260-2, and 260-3. It is to be appreciated that the embodiments are not limited to this example, and that apparatus 200 and/or system 240 may route data to lesser or greater numbers of nodes in other embodiments.

In various embodiments, adjacent upstream node 250 may comprise an intermediate routing node of a higher intermediate routing layer that that of apparatus 200 and/or system 240.

In some other embodiments, adjacent upstream node 250 may comprise a source server. In various embodiments, adjacent downstream nodes 260-1, 260-2, and 260-3 may comprise intermediate routing nodes of a lower intermediate routing layer that that of apparatus 200 and/or system 240. In some other embodiments, adjacent downstream nodes 260-1, 260-2, and 260-3 may comprise clients. The embodiments are not limited in this context.

In various embodiments, during general operation of apparatus 200 and/or system 240, communications component 206 may receive a data segment 214 from adjacent upstream node 250. In some embodiments, communications component 206 may then direct data segment 214 to retransmission filtering component 208. In various embodiments, communications component 206 may direct data segment 214 to retransmission filtering component 208 in response to a determination that data segment 214 comprises a multicast data segment. In some such embodiments, communications component 206 may determine that data segment 214 comprises a multicast data segment associated with a particular session based on destination and source internet protocol (IP) addresses, layer 4 (L4) protocol ID and L4 source and destination port numbers associated with data segment 214. The embodiments are not limited in this context.

In various embodiments, following receipt of data segment 214, retransmission filtering component 208 may perform a check to determine whether data segment 214 is a data segment that adjacent upstream node 250 has retransmitted to apparatus 200 and/or system 240 or is a data segment that adjacent upstream node 250 has just transmitted to apparatus 200 and/or system 240 for the first time. In some embodiments, retransmission filtering component 208 may perform this check based on forwarded segment information 216 maintained by session state controller 210. In various embodiments, forwarded segment information 216 may generally comprise information identifying data segments that have previously been forwarded to adjacent downstream nodes 260-1, 260-2, and 260-3. In some embodiments, for example, forwarded segment information 216 may comprise a list of sequence numbers and lengths describing one or more data segments that have previously been forwarded to adjacent downstream nodes 260-1, 260-2, and 260-3. In another example, in various embodiments, forwarded segment information 216 may comprise a list of sequence number ranges describing one or more data segments that have previously been forwarded to adjacent downstream nodes 260-1, 260-2, and 260-3. The embodiments are not limited to these examples.

FIG. 3 illustrates an example of a table 300 that may be representative of information that may be comprised in forwarded segment information 216 of FIG. 2 in some embodiments. For example, table 300 may be representative of information that may be comprised in forwarded segment information 216 in various embodiments in which forwarded segment information 216 comprises a list of sequence number and length pairs (SNLPs), each describing one or more data segments that have previously been forwarded to adjacent downstream nodes 260-1, 260-2, and 260-3. As shown in FIG. 3, table 300 comprises two SNLPs 302 and 304. SNLP 302 comprises the sequence number value '128' and the length value '32', corresponding to a sequence number range of 128-159. SNLP 304 comprises the sequence number value '192' and the length value '64', corresponding to a sequence number range of 192-255. The embodiments are not limited to this example.

Returning to FIG. 2, in some embodiments, retransmission filtering component 208 may determine whether data segment 214 is a retransmission of previously transmitted data based on whether the range of sequence numbers comprising data segment 214 matches—or comprises a subset of—any of the respective ranges of sequences numbers specified by forwarded segment information 216. In various embodiments, in response to a determination that data segment 214 is not a retransmission, retransmission filtering component 208 may update forwarded segment information 216 to include the range of sequence numbers comprising data segment 214 and instruct communications component 206 to forward data segment 214 to each of adjacent downstream nodes 260-1, 260-2, and 260-3.

In some embodiments, in response to a determination that data segment 214 is a retransmission, retransmission filtering component 208 may perform a check to identify any adjacent downstream nodes that have not acknowledged receipt of a previous transmission of data segment 214. In various embodiments, retransmission filtering component 208 may perform this check based on acknowledgment receipt information 218 maintained by session state controller 210. In some embodiments, acknowledgment receipt information 218 may comprise, for each of adjacent downstream nodes 260-1, 260-2, and 260-3, information identifying the highest acknowledgment number value received from that adjacent downstream node. In various such embodiments, acknowledgment receipt information 218 may also comprise information indicating, for each such highest acknowledgment number value, a number of times that that acknowledgment number value has been received from the corresponding adjacent downstream node.

FIG. 4 illustrates an example of a table 400 that may be representative of information that may be comprised in acknowledgment receipt information 218 of FIG. 2 in some embodiments. As shown in FIG. 4, table 400 comprises three entries, each of which may correspond to a respective adjacent downstream node. For example, entry 1 may correspond to adjacent downstream node 260-1 of FIG. 2, entry 2 may correspond to adjacent downstream node 260-2, and entry 3 may correspond to adjacent downstream node 260-3. For each entry, a w corresponding highest acknowledgment number value is specified, as well as a number of times that that acknowledgment number value has been received. For example, entry 1 indicates that the highest acknowledgment number value that its corresponding adjacent downstream node has received is '127', and that it has received two ACKs comprising this value. The embodiments are not limited to this example.

Returning to FIG. 2, in various embodiments, retransmission filtering component 208 may identify one or more adjacent downstream nodes that have not acknowledged receipt of a previous transmission of data segment 214 and communications component 206 may forward data segment 214 to each of those one or more adjacent downstream nodes. For example, if retransmission filtering component 208 determines that adjacent downstream node 260-3 has acknowledged receipt of a previous transmission of data segment 214 but adjacent downstream nodes 260-1 and 260-2 have not, then communications component 206 may forward data segment 214 to adjacent downstream nodes 260-1 and 260-2, but not to adjacent downstream node 260-3. The embodiments are not limited to this example.

In some embodiments, communications component 206 may receive respective acknowledgments (ACKs) from one or more adjacent downstream nodes in response to the forwarded data segment 214. For example, after forwarding data segment 214 to adjacent downstream nodes 260-1 and 260-2, communications component 206 may receive an ACK 262-1 from adjacent downstream node 260-1 and/or an ACK 262-2 from adjacent downstream node 262-2. In various embodiments, communications component 206 may direct ACKs 262-1 and/or 262-2 to ACK suppression component 212 in response to a determination that ACKs 262-1 and/or 262-2 comprise acknowledgments of forwarded multicast data segments. In some such embodiments, communications component 206 may determine that ACKs 262-1 and/or 262-2 comprise acknowledgments of forwarded multicast data segments based on a destination IP address and L4 port number associated with ACKs 262-1 and 262-2. The embodiments are not limited in this context.

In various embodiments, each time it receives an ACK, ACK suppression component 212 may perform a check to determine whether acknowledgment receipt information 218 should be updated based on the newly received ACK. More particularly, in some embodiments, ACK suppression component 212 may identify an entry in acknowledgment receipt information 218 that corresponds to the adjacent downstream node from which it received the ACK and determine whether to update that entry. In various embodiments, ACK suppression component 212 may determine whether to update the entry based on a comparison of the acknowledgment number value comprised in the entry with an acknowledgment number value comprised in the received ACK.

In some embodiments, if the acknowledgment number value comprised in the received ACK is less than that comprised in the entry, ACK suppression component 212 may discard the received ACK and take no further action. In various embodiments, if the acknowledgment number value comprised in the received ACK is equal to that comprised in the entry, ACK suppression component 212 may increment a counter comprised in the entry that specifies how many times the corresponding acknowledgment number value has been received from that adjacent downstream node. In some embodiments, if the acknowledgment number value comprised in the received ACK is greater than that comprised in the entry, ACK suppression component 212 may replace the acknowledgment number value comprised in the entry with the one comprised in the received ACK and reset the counter to a value of 1.

In various embodiments, if it has made any changes to the identified entry in acknowledgment receipt information 218, ACK suppression component 212 may next perform a check to determine whether to update acknowledgment forwarding information 220 that it may maintain during ongoing operation. In some embodiments, acknowledgment forwarding information 220 may comprise information identifying the smallest value among the respective highest acknowledgment number values comprised in the various entries of acknowledgment receipt information 218. In various such embodiments, acknowledgment forwarding information 220 may also comprise information identifying the respective ID(s) of one or more entries that comprise that smallest value and a counter specifying how many ACKs comprising that smallest value have been forwarded upstream.

FIG. 5 illustrates an example of a table 500 that may be representative of information that may be comprised in acknowledgment forwarding information 220 of FIG. 2 in some embodiments. As shown in FIG. 5, table 500 identifies a minimum highest ACK number of '127', and indicates that this value matches the highest ACK number value comprised in entry 1 of an associated set of acknowledgment receipt information such as acknowledgment receipt information 218 of FIG. 2. Table 500 also indicates that one ACK comprising that value has previously been forwarded upstream. The embodiments are not limited to this example.

Returning to FIG. 2, in various embodiments, after receiving an ACK from an adjacent downstream node, determining that an acknowledgment number value comprised in the received ACK is equal to that comprised in an entry corresponding to the adjacent downstream node in acknowledgment receipt information 218, and incrementing the counter in that entry, ACK suppression component 212 may compare the incremented counter value to the value of the counter comprised in acknowledgment forwarding information 220. In some embodiments, if the incremented counter value is less than or equal to the value of the counter comprised in acknowledgment forwarding information 220, ACK suppression component 212 may discard the received ACK and take no further action. In various embodiments, if the incremented counter value is greater than the value of the counter comprised in acknowledgment forwarding information 220, ACK suppression component 212 may send, to an adjacent upstream node, an ACK comprising the acknowledgment number value specified in acknowledgment forwarding information 220 and increment the counter comprised in acknowledgment forwarding information 220.

In some embodiments, after receiving an ACK from an adjacent downstream node, determining that an acknowledgment number value comprised in the received ACK is greater than that comprised in an entry corresponding to the adjacent downstream node in acknowledgment receipt information 218, and updating the entry accordingly, ACK suppression component 212 may determine whether the entry ID for the updated entry is among those specified in acknowledgment forwarding information 220. In various embodiments, if the entry ID for the updated entry is among those specified in acknowledgment forwarding information 220, the entry ID may be removed from acknowledgment forwarding information 220. In some embodiments, if no entry IDs remain in acknowledgment forwarding information 220 following removal of the entry ID for the updated entry, ACK suppression component 212 may reinitialize acknowledgment forwarding information 220. In various embodiments, in order to enable proper reinitialization of acknowledgment forwarding information 220, ACK suppression component 212 may scan acknowledgment receipt information 218 to identify a new smallest value among the respective highest acknowledgment number values comprised in the various entries of acknowledgment receipt information 218. In some embodiments, ACK suppression component 212 may then reinitialize acknowledgment forwarding information 220 by populating it with this new value and the IDs of the entries within acknowledgment receipt information 218 that contain the new value and resetting the counter comprised in acknowledgment forwarding information 220 to a value of 1.

In various embodiments, if no entry IDs remain in acknowledgment forwarding information 220 following removal of the entry ID for updated entry in acknowledgment receipt information 218, this may indicate that data that had not previously been acknowledged by all adjacent downstream nodes has now been universally acknowledged. Following its reinitialization, acknowledgment forwarding information 220 may specify an acknowledgment number value corresponding to that data. As such, following reinitialization of acknowledgment forwarding information 220, ACK suppression component 212 may instruct communications component 206 to send a new collective ACK 222 upstream that comprises the value specified in the reinitialized acknowledgment forwarding information 220.

In some embodiments, in response to the reinitialization of acknowledgment forwarding information 220, session state controller 210 may initiate a cleanup procedure for forwarded segment information 216. In various embodiments, session state controller 210 may start a cleanup timer for any elements in forwarded segment information 216 that correspond to portions of the newly collectively acknowledged data, and may delete those elements from forwarded segment information 216 if no retransmission of the data has been received from the adjacent upstream node when the cleanup timer expires. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
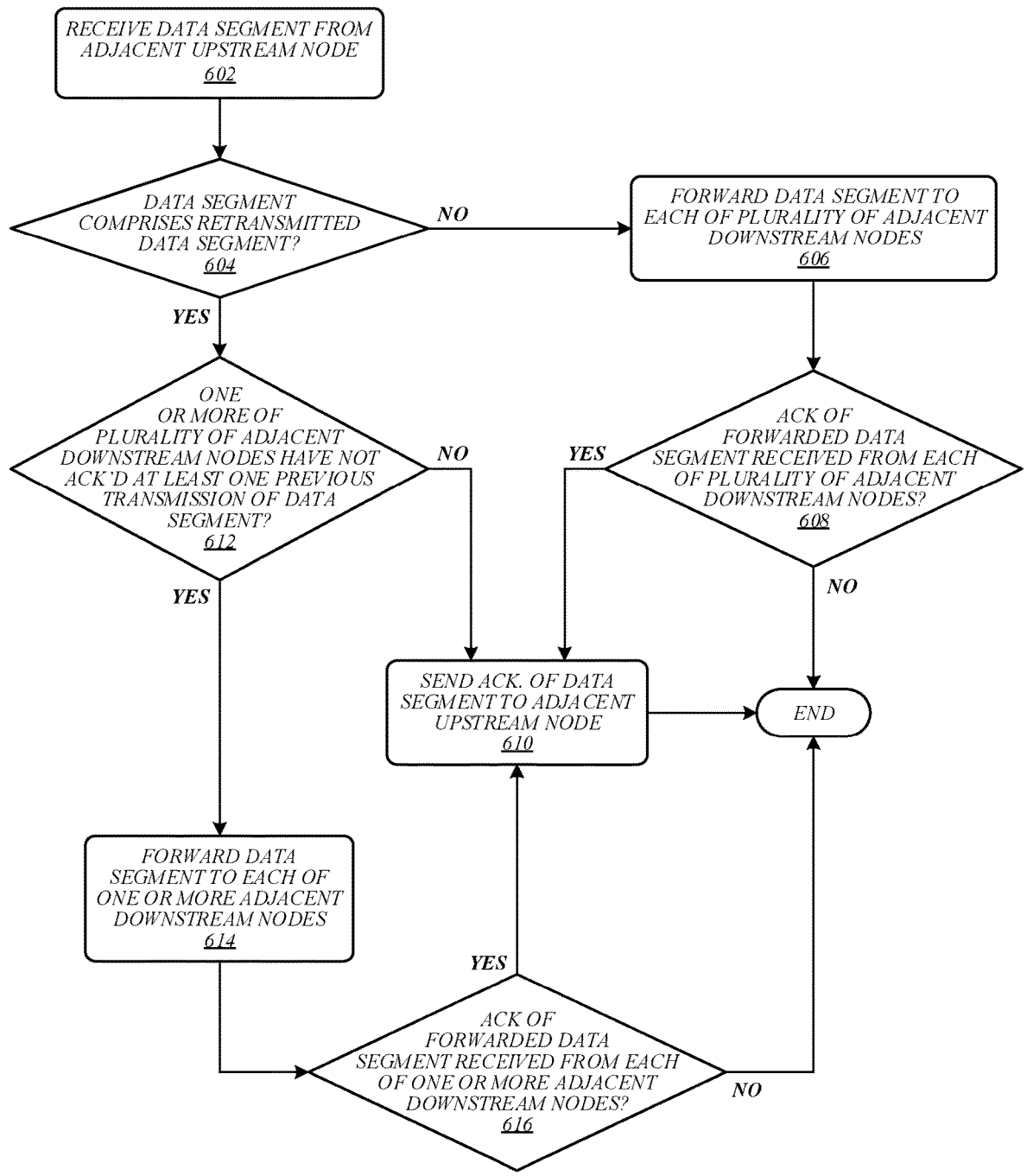
FIG. 6 illustrates an embodiment of a logic flow.

FIG. 6 illustrates an example of a logic flow 600 that may be representative of the implementation of one or more of the disclosed efficient error control techniques for TCP-based multicast networks in some embodiments. More particularly, logic flow may be representative of operations that may be performed by a device, such as apparatus 200 and/or system 240 of FIG. 2, acting as an intermediate routing node such as a node in intermediate routing layer 106 of FIG. 1. As shown in FIG. 6, a data segment may be received from an adjacent upstream node at 602. For example, communications component 206 of FIG. 2 may receive data segment 214 from adjacent upstream node 250. At 604, it may be determined whether the received data segment comprises a retransmitted data segment. For example, retransmission filtering component 208 of FIG. 2 may determine whether data segment 214 comprises a retransmitted data segment based on whether forwarded segment information 216 indicates that it has previously been forwarded downstream.

If it is determined at 604 that the received data segment does not comprise a retransmitted data segment, flow may pass to 606. At 606, the received data segment may be forwarded to each of a plurality of adjacent downstream nodes. For example, following a determination by retransmission filtering component 208 of FIG. 2 that data segment 214 does not comprise a retransmitted data segment, communications component 206 may forward data segment 214 to each of adjacent downstream nodes 260-1, 260-2, and 260-3. From 606, flow may pass to 608, where it may be determined whether a respective acknowledgment of the forwarded data segment has been received from each of the plurality of adjacent downstream nodes. For example, ACK suppression component 212 of FIG. 2 may determine whether each of adjacent downstream nodes 260-1, 260-2, and 260-3 has acknowledged data segment 214 based on acknowledgment receipt information 218. If it is determined at 608 that at least one of the plurality of adjacent downstream nodes has not acknowledged the forwarded data segment, the logic flow may end. If it is determined at 608 that each of the plurality of adjacent downstream nodes has acknowledged the forwarded data segment, flow may pass to 610. At 610, an acknowledgment of the data segment may be sent to an adjacent upstream node. For example, following a determination by ACK suppression component 212 of FIG. 2 that each of adjacent downstream nodes 260-1, 260-2, and 260-3 has acknowledged data segment 214, communications component 206 may send ACK 222 to adjacent upstream node 250. Following 610, the logic flow may end.

If it is determined at 604 that the received data segment comprises a retransmitted data segment, flow may pass to 612. At 612, it may be determined whether one or more of the plurality of adjacent downstream nodes have not acknowledged at least one previous transmission of the data segment. For example, ACK suppression component 212 of FIG. 2 may determine whether one or more of adjacent downstream nodes 260-1, 260-2, and 260-3 have not acknowledged at least one previous transmission of data segment 214 based on acknowledgment receipt information 218. If it is determined at 612 that each of the plurality of adjacent downstream nodes has acknowledged at least one previous transmission of the data segment, flow may pass to 610 and proceed as described above. If it is determined at 612 that one or more of the plurality of adjacent downstream nodes have not acknowledged at least one previous transmission of the data segment, flow may pass to 614.

At 614, the data segment may be forwarded to each of the one or more adjacent downstream nodes that have not acknowledged at least one previous transmission of the data segment. For example, following a determination by ACK suppression component 212 of FIG. 2 that one or more of adjacent downstream nodes 260-1, 260-2, and 260-3 have not acknowledged at least one previous transmission of data segment 214, communications component 206 may forward data segment 214 to those one or more of adjacent downstream nodes 260-1, 260-2, and 260-3. From 614, flow may pass to 616, where it may be determined whether a respective acknowledgment of the forwarded data segment has been received from each of the one or more adjacent downstream nodes to which it was forwarded at 614. For example, ACK suppression component 212 of FIG. 2 may determine whether a respective acknowledgment of data segment 214 has been received from each of the one or more of adjacent downstream nodes 260-1, 260-2, and 260-3 to which it was forwarded by communications component 206. If it is determined at 616 that a respective acknowledgment of the forwarded data segment has been received from each of the one or more adjacent downstream nodes, flow may pass to 610 and proceed as described above. If it is determined at 616 that a respective acknowledgment of the forwarded data segment has not been received from each of the one or more adjacent downstream nodes, the logic flow may end. The embodiments are not limited to these examples.

Figure 7:
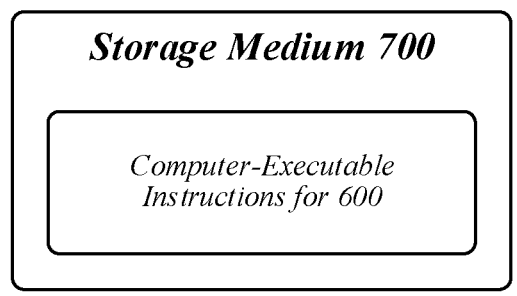
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
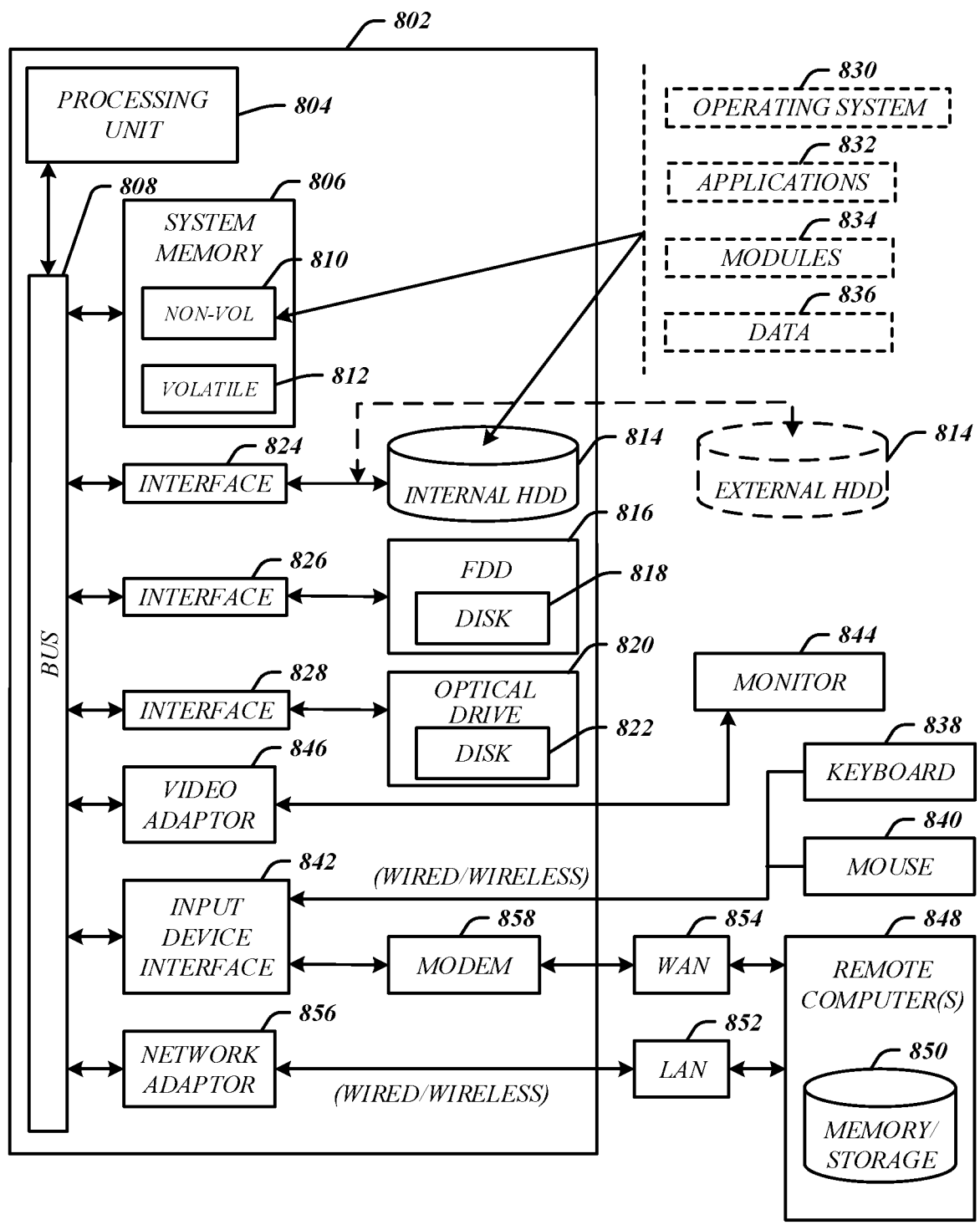
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatus 200 and/or system 240 of FIG. 2. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of apparatus 200 and/or system 240.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
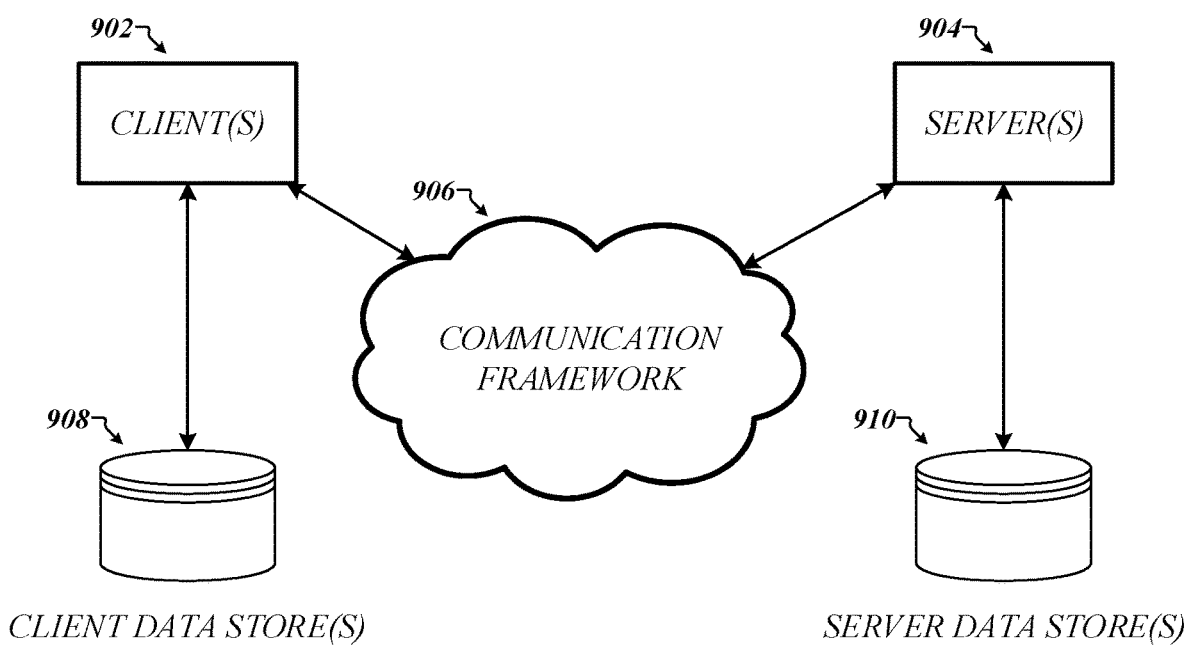
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. Any one of clients 902 and/or servers 904 may implement one or more of apparatus 200 and/or system 240 of FIG. 2, logic flow 600 of FIG. 6, storage medium 700 of FIG. 7, and computing architecture 800 of FIG. 8. In various embodiments, apparatus 200 and/or system 240 may be implemented in one or more switching devices and/or routing devices in communication framework 906.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Jo Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a Jo machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory, and logic for routing data at a node of a multicast tree, at least a portion of the logic comprised in hardware coupled to the at least one memory, the logic to identify a data segment that has been retransmitted to the node from an adjacent upstream node, determine whether each of a plurality of adjacent downstream nodes have acknowledged at least one previous transmission of the data segment, and in response to a determination that one or more of the adjacent downstream nodes have not acknowledged at least one previous transmission of the data segment, forward the data segment to each of the one or more adjacent downstream nodes.

Example 2 is the apparatus of Example 1, the logic to refrain from forwarding the data segment and send an acknowledgment of the data segment in response to a determination that all of the adjacent downstream nodes have acknowledged at least one previous transmission of the data segment.

Example 3 is the apparatus of Example 1, the logic to send an acknowledgment of the data segment in response to receipt of respective acknowledgments of the forwarded data segment from each of the one or more adjacent downstream nodes.

Example 4 is the apparatus of Example 1, the logic to refrain from sending an acknowledgment of the data segment in response to a determination that at least one of the one or more adjacent downstream nodes has failed to acknowledge the forwarded data segment.

Example 5 is the apparatus of Example 1, the logic to maintain a sent sequence number list identifying sequence numbers associated with previously forwarded data segments, and identify the data segment as a retransmitted data segment in response to a determination that a sequence number associated with the data segment matches a sequence number identified by the sent sequence number list.

Example 6 is the apparatus of Example 1, the adjacent upstream node to comprise a source server of the multicast tree.

Example 7 is the apparatus of Example 1, the adjacent upstream node to comprise an intermediate routing node of the multicast tree.

Example 9 is the apparatus of Example 1, the multicast tree to comprise a transmission control protocol (TCP) multicast tree.

Example 10 is the apparatus of Example 1, the logic to receive a second data segment from the adjacent upstream node, and in response to a determination that the second data segment does not comprise a retransmitted data segment, forward the second data segment to each of the plurality of adjacent downstream nodes.

Example 11 is the apparatus of Example 10, the logic to update a sent sequence number list to indicate that the second data segment has been received and forwarded.

Example 12 is the apparatus of Example 10, the logic to send an acknowledgment of the second data segment in response to receipt of respective acknowledgments of the forwarded second data segment from each of the plurality of adjacent downstream nodes.

Example 13 is a system, comprising an apparatus according to any of Examples 1 to 12, and at least one network interface.

Example 14 is at least one non-transitory computer-readable storage medium comprising a set of instructions that, in response to being executed at a node of a multicast tree, cause the node to identify a data segment that has been retransmitted to the node from an adjacent upstream node, determine whether each of a plurality of adjacent downstream nodes have acknowledged at least one previous transmission of the data segment, and in response to a determination that one or more of the adjacent downstream nodes have not acknowledged at least one previous transmission of the data segment, forward the data segment to each of the one or more adjacent downstream nodes.

Example 15 is the at least one non-transitory computer-readable storage medium of Example 14, comprising instructions that, in response to being executed at the node, cause the node to refrain from forwarding the data segment and send an acknowledgment of the data segment in response to a determination that all of the adjacent downstream nodes have acknowledged at least one previous transmission of the data segment.

Example 16 is the at least one non-transitory computer-readable storage medium of Example 14, comprising instructions that, in response to being executed at the node, cause the node to send an acknowledgment of the data segment in response to receipt of respective acknowledgments of the forwarded data segment from each of the one or more adjacent downstream nodes.

Example 17 is the at least one non-transitory computer-readable storage medium of Example 14, comprising instructions that, in response to being executed at the node, cause the node to refrain from sending an acknowledgment of the data segment in response to a determination that at least one of the one or more adjacent downstream nodes has failed to acknowledge the forwarded data segment.

Example 18 is the at least one non-transitory computer-readable storage medium of Example 14, comprising instructions that, in response to being executed at the node, cause the node to maintain a sent sequence number list identifying sequence numbers associated with previously forwarded data segments, and identify the data segment as a retransmitted data segment in response to a determination that a sequence number associated with the data segment matches a sequence number identified by the sent sequence number list.

Example 19 is the at least one non-transitory computer-readable storage medium of Example 14, the adjacent upstream node to comprise a source server of the multicast tree.

Example 20 is the at least one non-transitory computer-readable storage medium of Example 14, the adjacent upstream node to comprise an intermediate routing node of the multicast tree.

Example 22 is the at least one non-transitory computer-readable storage medium of Example 14, the multicast tree to comprise a transmission control protocol (TCP) multicast tree.

Example 23 is the at least one non-transitory computer-readable storage medium of Example 14, comprising instructions that, in response to being executed at the node, cause the node to receive a second data segment from the adjacent upstream node, and in response to a determination that the second data segment does not comprise a retransmitted data segment, forward the second data segment to each of the plurality of adjacent downstream nodes.

Example 24 is the at least one non-transitory computer-readable storage medium of Example 23, comprising instructions that, in response to being executed at the node, cause the node to update a sent sequence number list to indicate that the second data segment has been received and forwarded.

Example 25 is the at least one non-transitory computer-readable storage medium of Example 23, comprising instructions that, in response to being executed at the node, cause the node to send an acknowledgment of the second data segment in response to receipt of respective acknowledgments of the forwarded second data segment from each of the plurality of adjacent downstream nodes.

Example 26 is a method, comprising identifying, by processing circuitry of a node of a multicast tree, a data segment that has been retransmitted to the node from an adjacent upstream node, determining whether each of a plurality of adjacent downstream nodes have acknowledged at least one previous transmission of the data segment, and in response to a determination that one or more of the adjacent downstream nodes have not acknowledged at least one previous transmission of the data segment, forwarding the data segment to each of the one or more adjacent downstream nodes.

Example 27 is the method of Example 26, comprising refraining from forwarding the data segment and sending an acknowledgment of the data segment in response to a determination that all of the adjacent downstream nodes have acknowledged at least one previous transmission of the data segment.

Example 28 is the method of Example 26, comprising sending an acknowledgment of the data segment in response to receipt of respective acknowledgments of the forwarded data segment from each of the one or more adjacent downstream nodes.

Example 29 is the method of Example 26, comprising refraining from sending an acknowledgment of the data segment in response to a determination that at least one of the one or more adjacent downstream nodes has failed to acknowledge the forwarded data segment.

Example 30 is the method of Example 26, comprising maintaining a sent sequence number list identifying sequence numbers associated with previously forwarded data segments, and identifying the data segment as a retransmitted data segment in response to a determination that a sequence number associated with the data segment matches a sequence number identified by the sent sequence number list.

Example 31 is the method of Example 26, the adjacent upstream node to comprise a source server of the multicast tree.

Example 32 is the method of Example 26, the adjacent upstream node to comprise an intermediate routing node of the multicast tree.

Example 34 is the method of Example 26, the multicast tree to comprise a transmission control protocol (TCP) multicast tree.

Example 35 is the method of Example 26, comprising receiving a second data segment from the adjacent upstream node, and in response to a determination that the second data segment does not comprise a retransmitted data segment, forwarding the second data segment to each of the plurality of adjacent downstream nodes.

Example 36 is the method of Example 35, comprising updating a sent sequence number list to indicate that the second data segment has been received and forwarded.

Example 37 is the method of Example 35, comprising sending an acknowledgment of the second data segment in response to receipt of respective acknowledgments of the forwarded second data segment from each of the plurality of adjacent downstream nodes.

Example 38 is at least one non-transitory computer-readable storage medium comprising a set of instructions that, in response to being executed on a computing device, cause the computing device to perform a method according to any of Examples 26 to 37.

Example 39 is an apparatus, comprising means for performing a method according to any of Examples 26 to 37.

Example 40 is a system, comprising the apparatus of Example 39, and at least one network interface.

Example 41 is an apparatus, comprising means for identifying, at a node of a multicast tree, a data segment that has been retransmitted to the node from an adjacent upstream node, means for determining whether each of a plurality of adjacent downstream nodes have acknowledged at least one previous transmission of the data segment, and means for forwarding the data segment to each of the one or more adjacent downstream nodes in response to a determination that one or more of the adjacent downstream nodes have not acknowledged at least one previous transmission of the data segment.

Example 42 is the apparatus of Example 41, comprising means for refraining from forwarding the data segment and sending an acknowledgment of the data segment in response to a determination that all of the adjacent downstream nodes have acknowledged at least one previous transmission of the data segment.

Example 43 is the apparatus of Example 41, comprising means for sending an acknowledgment of the data segment in response to receipt of respective acknowledgments of the forwarded data segment from each of the one or more adjacent downstream nodes.

Example 44 is the apparatus of Example 41, comprising means for refraining from sending an acknowledgment of the data segment in response to a determination that at least one of the one or more adjacent downstream nodes has failed to acknowledge the forwarded data segment.

Example 45 is the apparatus of Example 41, comprising means for maintaining a sent sequence number list identifying sequence numbers associated with previously forwarded data segments, and means for identifying the data segment as a retransmitted data segment in response to a determination that a sequence number associated with the data segment matches a sequence number identified by the sent sequence number list.

Example 46 is the apparatus of Example 41, the adjacent upstream node to comprise a source server of the multicast tree.

Example 47 is the apparatus of Example 41, the adjacent upstream node to comprise an intermediate routing node of the multicast tree.

Example 49 is the apparatus of Example 41, the multicast tree to comprise a transmission control protocol (TCP) multicast tree.

Example 50 is the apparatus of Example 41, comprising means for receiving a second data segment from the adjacent upstream node, and means for forwarding the second data segment to each of the plurality of adjacent downstream nodes in response to a determination that the second data segment does not comprise a retransmitted data segment.

Example 51 is the apparatus of Example 50, comprising means for updating a sent sequence number list to indicate that the second data segment has been received and forwarded.

Example 52 is the apparatus of Example 50, comprising means for sending an acknowledgment of the second data segment in response to receipt of respective acknowledgments of the forwarded second data segment from each of the plurality of adjacent downstream nodes.

Example 53 is a system, comprising an apparatus according to any of Examples 41 to 52, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    at least one memory; and
    circuitry for routing data at a node of a transmission control protocol (TCP) multicast tree, the circuitry coupled to the at least one memory, the circuitry to:
    identify a data segment that has been retransmitted to the node from an adjacent upstream node;
    determine whether each of a plurality of adjacent downstream nodes have acknowledged at least one previous transmission of the data segment; and
    in response to a determination that one or more of the adjacent downstream nodes have not acknowledged at least one previous transmission of the data segment, forward the data segment to each of the one or more adjacent downstream nodes.

2. The apparatus of claim 1, the circuitry to refrain from forwarding the data segment and send an acknowledgment of the data segment to the adjacent upstream node in response to a determination that all of the adjacent downstream nodes have acknowledged at least one previous transmission of the data segment.

3. The apparatus of claim 1, the circuitry to send an acknowledgment of the data segment to the adjacent upstream node in response to receipt of respective acknowledgments of the forwarded data segment from each of the one or more adjacent downstream nodes.

4. The apparatus of claim 1, the circuitry to refrain from sending an acknowledgment of the data segment to the adjacent upstream node in response to a determination that at least one of the one or more adjacent downstream nodes has failed to acknowledge the forwarded data segment.

5. The apparatus of claim 1, the circuitry to:
    maintain a sent sequence number list identifying sequence numbers associated with previously forwarded data segments; and
    identify the data segment as a retransmitted data segment in response to a determination that a sequence number associated with the data segment matches a sequence number identified by the sent sequence number list.

6. The apparatus of claim 1, the adjacent upstream node to comprise a source server of the multicast tree.

7. The apparatus of claim 1, the adjacent upstream node to comprise an intermediate routing node of the multicast tree.

8. A system, comprising:
    the apparatus of claim 1; and
    at least one network interface.

9. At least one non-transitory computer-readable storage medium comprising a set of instructions that, in response to being executed at a node of a transmission control protocol (TCP) multicast tree, cause the node to:
    identify a data segment that has been retransmitted to the node from an adjacent upstream node;
    determine whether each of a plurality of adjacent downstream nodes have acknowledged at least one previous transmission of the data segment; and
    in response to a determination that one or more of the adjacent downstream nodes have not acknowledged at least one previous transmission of the data segment, forward the data segment to each of the one or more adjacent downstream nodes.

10. The at least one non-transitory computer-readable storage medium of claim 9, comprising instructions that, in response to being executed at the node, cause the node to refrain from forwarding the data segment and send an acknowledgment of the data segment to the adjacent upstream node in response to a determination that all of the adjacent downstream nodes have acknowledged at least one previous transmission of the data segment.

11. The at least one non-transitory computer-readable storage medium of claim 9, comprising instructions that, in response to being executed at the node, cause the node to send an acknowledgment of the data segment to the adjacent upstream node in response to receipt of respective acknowledgments of the forwarded data segment from each of the one or more adjacent downstream nodes.

12. The at least one non-transitory computer-readable storage medium of claim 9, comprising instructions that, in response to being executed at the node, cause the node to refrain from sending an acknowledgment of the data segment to the adjacent upstream node in response to a determination that at least one of the one or more adjacent downstream nodes has failed to acknowledge the forwarded data segment.

13. The at least one non-transitory computer-readable storage medium of claim 9, comprising instructions that, in response to being executed at the node, cause the node to:
- maintain a sent sequence number list identifying sequence numbers associated with previously forwarded data segments; and
- identify the data segment as a retransmitted data segment in response to a determination that a sequence number associated with the data segment matches a sequence number identified by the sent sequence number list.

14. The at least one non-transitory computer-readable storage medium of claim 9, the adjacent upstream node to comprise a source server of the multicast tree.

15. The at least one non-transitory computer-readable storage medium of claim 9, the adjacent upstream node to comprise an intermediate routing node of the multicast tree.

16. A method, comprising:
- identifying, by processing circuitry of a node of a transmission control protocol (TCP) multicast tree, a data segment that has been retransmitted to the node from an adjacent upstream node;
- determining whether each of a plurality of adjacent downstream nodes have acknowledged at least one previous transmission of the data segment; and
- in response to a determination that one or more of the adjacent downstream nodes have not acknowledged at least one previous transmission of the data segment, forwarding the data segment to each of the one or more adjacent downstream nodes.

17. The method of claim 16, comprising refraining from forwarding the data segment and sending an acknowledgment of the data segment to the adjacent upstream node in response to a determination that all of the adjacent downstream nodes have acknowledged at least one previous transmission of the data segment.

18. The method of claim 16, comprising sending an acknowledgment of the data segment to the adjacent upstream node in response to receipt of respective acknowledgments of the forwarded data segment from each of the one or more adjacent downstream nodes.

19. The method of claim 16, comprising refraining from sending an acknowledgment of the data segment to the adjacent upstream node in response to a determination that at least one of the one or more adjacent downstream nodes has failed to acknowledge the forwarded data segment.

20. The method of claim 16, comprising:
- maintaining a sent sequence number list identifying sequence numbers associated with previously forwarded data segments; and
- identifying the data segment as a retransmitted data segment in response to a determination that a sequence number associated with the data segment matches a sequence number identified by the sent sequence number list.

21. The method of claim 16, the adjacent upstream node comprising a source server of the multicast tree.

22. The method of claim 16, the adjacent upstream node comprising an intermediate routing node of the multicast tree.

23. An apparatus, comprising:
- means for determining, at a node of a multicast tree, that a received data segment has been retransmitted to the node from an adjacent upstream node;
- means for determining whether one or more adjacent downstream nodes of a plurality of adjacent downstream nodes have acknowledged at least one previous transmission of the data segment; and
- means for forwarding the data segment to each of the one or more adjacent downstream nodes in response to a determination that the one or more of the adjacent downstream nodes have not acknowledged at least one previous transmission of the data segment.

24. The apparatus of claim 23, comprising means for sending an acknowledgment of the data segment in response to receipt of respective acknowledgments of the forwarded data segment from each of the one or more adjacent downstream nodes.

25. The apparatus of claim 23, comprising means for receiving the data segment at the node of the multicast tree.

* * * * *